(12) United States Patent
Ling et al.

(10) Patent No.: US 10,212,631 B2
(45) Date of Patent: Feb. 19, 2019

(54) METHODS AND DEVICES FOR FAST DOWNLINK RADIO ACCESS TECHNOLOGY SELECTION

(71) Applicants: Jonathan Ling, North Brunswick, NJ (US); David Lopez-Perez, Blanchardstown (IE); Bong Ho Kim, Morganville, NJ (US); Doru Calin, Manalapan, NJ (US); Vasudevan Subramanian, Morristown, NJ (US)

(72) Inventors: Jonathan Ling, North Brunswick, NJ (US); David Lopez-Perez, Blanchardstown (IE); Bong Ho Kim, Morganville, NJ (US); Doru Calin, Manalapan, NJ (US); Vasudevan Subramanian, Morristown, NJ (US)

(73) Assignee: Nokia of America Corporation, Murray Hill, NJ (US)

( * ) Notice: Subject to any disclaimer, the term of this patent is extended or adjusted under 35 U.S.C. 154(b) by 448 days.

(21) Appl. No.: 14/938,144

(22) Filed: Nov. 11, 2015

(65) Prior Publication Data

US 2017/0135009 A1 May 11, 2017

(51) Int. Cl.
| | |
|---|---|
| *H04W 36/12* | (2009.01) |
| *H04L 12/26* | (2006.01) |
| *H04L 12/46* | (2006.01) |
| *H04L 1/00* | (2006.01) |
| *H04L 12/841* | (2013.01) |
| *H04L 12/729* | (2013.01) |
| *H04W 40/12* | (2009.01) |

(Continued)

(52) U.S. Cl.
CPC ........... *H04W 36/12* (2013.01); *H04L 1/0023* (2013.01); *H04L 1/0034* (2013.01); *H04L 12/4633* (2013.01); *H04L 43/12* (2013.01); *H04L 45/125* (2013.01); *H04L 45/22* (2013.01); *H04L 45/26* (2013.01); *H04L 47/283* (2013.01); *H04W 40/12* (2013.01); *H04W 88/06* (2013.01)

(58) Field of Classification Search
None
See application file for complete search history.

(56) References Cited

U.S. PATENT DOCUMENTS

2015/0350989 A1* 12/2015 Himayat ........... H04W 36/0066
370/331
2016/0338133 A1* 11/2016 Lee ..................... H04W 76/025

(Continued)

*Primary Examiner* — Rebecca E Song
(74) *Attorney, Agent, or Firm* — Harness, Dickey & Pierce, P.L.C.

(57) ABSTRACT

A radio access network element includes a cellular interface and a processor. The cellular interface is configured to communicate with the user equipment via a cellular link. The processor is configured execute computer readable instructions to cause the radio access network element to: transmit a plurality of probe packets to the user equipment via an IP tunnel between the radio access network element and the user equipment through a wireless local area network access point; receive a probe packet response from the user equipment, the probe packet response being indicative of a connection quality of the IP tunnel between the radio access network element and the user equipment; and determine whether to switch from a first traffic routing mode to a second traffic routing mode based on the probe packet response from the user equipment.

22 Claims, 6 Drawing Sheets

(51) Int. Cl.
*H04L 12/707* (2013.01)
*H04L 12/721* (2013.01)
*H04W 88/06* (2009.01)

(56) References Cited

U.S. PATENT DOCUMENTS

2017/0099625 A1* 4/2017 Li ........................ H04W 28/08
2017/0127330 A1* 5/2017 Payyappilly .......... H04W 24/10

* cited by examiner

METHODS AND DEVICES FOR FAST DOWNLINK RADIO ACCESS TECHNOLOGY SELECTION

BACKGROUND

In general, cellular systems using licensed spectrum (e.g., $3^{rd}$ Generation Partnership Project (3GPP) Long Term Evolution (LTE) systems) and wireless local area networks (WLANs) using unlicensed bands of spectrum (e.g., Wireless Fidelity (WiFi) or other local access) are used for providing wireless services in a complementary manner. Cellular systems generally provide macro cellular coverage outdoors and with some in-building reach, whereas WLANs generally serve enterprises, residences, public venues, and the like.

The overlap between coverage areas of the cellular systems and WLANs is expected to increase over time. Unfortunately, however, there are currently no existing solutions for automatically managing cellular and WLAN links to distribute load among these different technologies.

SUMMARY

One or more example embodiments provide link management methods, systems, devices and non-transitory computer readable-mediums that differ from conventional link management approaches in which all managed links belong to the same technology and/or statistics given by the protocol stacks are available to make decisions. At least some example embodiments enable switching between links belonging to different technologies for which the respective protocol stack statistics (e.g., number of users, queue depth, etc.) are unknown.

According to at least some example embodiments, conventional wireless local area network access points (WLAN APs) need not be modified, and statistics and/or cross-layer information from the eNB need not be obtained. Consequently, example embodiments are backward compatible with conventional WLAN APs and eNBs.

At least one example embodiment provides a radio access network element configured to route traffic between a server and user equipment. According to at least this example embodiment, the radio access network element includes: a cellular interface configured to communicate with the user equipment via a cellular link; and a processor. The processor is configured execute computer readable instructions to cause the radio access network element to: transmit a plurality of probe packets to the user equipment via an IP tunnel between the radio access network element and the user equipment through a wireless local area network access point; receive a probe packet response from the user equipment, the probe packet response being indicative of a connection quality of the IP tunnel between the radio access network element and the user equipment; and determine whether to switch from a first traffic routing mode to a second traffic routing mode based on the probe packet response from the user equipment. In the first traffic routing mode (e.g., a WLAN only mode), downlink traffic from the server is delivered to the user equipment via a first data path through the wireless local area network access point. In the second traffic routing mode (e.g., a boost mode), the downlink traffic from the server is delivered to the user equipment via a second data path including the IP tunnel between the radio access network element and the wireless local area network access point.

According to at least some example embodiments, the first data path does not traverse the radio access network element.

In the second traffic routing mode, uplink traffic from the user equipment may be delivered to the server via a third data path including the radio access network element and the cellular link.

The probe packet response may include a set of the plurality of probe packets echoed back from the user equipment to the radio access network element, an estimated available bandwidth for the user equipment at the wireless local area network access point, and a number of transmitted probe packets not received at the user equipment.

The processor may be further configured to execute computer readable instructions to cause the radio access network element to: measure a round trip time delay for the plurality of probe packets based on the set of the plurality of probe packets echoed back from the user equipment; and switch from the first traffic routing mode to the second traffic routing mode if (i) the number of transmitted probe packets not received at the user equipment is less than a probe packet loss threshold, (ii) the measured round trip time delay is less than a round trip time delay threshold, and (iii) the estimated available bandwidth is greater than a minimum throughput threshold.

The processor may be further configured to execute computer readable instructions to cause the radio access network element to: monitor the connection quality of the IP tunnel between the radio access network element and the user equipment; and switch from the second traffic routing mode to a third traffic routing mode (e.g., an EUTRA only mode) if the connection quality of the IP tunnel falls below a minimum threshold quality; wherein in the third traffic routing mode, downlink traffic from the server is delivered to the user equipment via a third data path including the cellular link between the radio access network element and the user equipment.

The processor may be further configured to execute computer readable instructions to cause the radio access network element to: determine whether the connection quality of the IP tunnel has fallen below the minimum threshold quality based on (i) an average traffic activity for the user equipment and (ii) a difference between the estimated available bandwidth and the average traffic activity for the user equipment.

The processor may be further configured to execute computer readable instructions to cause the radio access network element to: determine whether the user equipment has become inactive; and switch from the second traffic routing mode to a third traffic routing mode (e.g., a WLAN (UL)) if the user equipment is determined to be inactive; wherein in the third traffic routing mode, the downlink traffic from the server is delivered to the user equipment via the second data path including the IP tunnel between the radio access network element and the wireless local area network access point, and uplink traffic from the user equipment is delivered to the server via the second data path including the IP tunnel between the radio access network element and the wireless local area network access point.

The processor may be further configured to execute computer readable instructions to cause the radio access network element to: determine whether the user equipment has become active; and switch from the third traffic routing mode to the second traffic routing mode if the user equipment is determined to be active.

At least one other example embodiment provides a radio access network element, comprising: a cellular interface configured to receive, from a user equipment via a cellular link, wireless local area network access point parameters for a plurality of wireless local area network access points; and a processor. The process is configured execute computer readable instructions to cause the radio access network element to: select, from among the plurality of wireless local area network access points, a wireless local area network access point for the user equipment based on the received wireless local area network access point parameters; instruct the user equipment to establish a wireless local area network connection with the selected wireless local area network access point; and establish an IP tunnel between the radio access network element and the user equipment through the selected wireless local area network access point.

According to at least some example embodiments, the wireless local area network access point parameters may include service set identifiers, received signal strength indications and an estimated available bandwidth for the wireless local area network access points.

The processor may be further configured execute computer readable instructions to cause the radio access network element to: transmit a plurality of probe packets to the user equipment via the established IP tunnel; receive a probe packet response from the user equipment, the probe packet response being indicative of a connection quality of the established IP tunnel between the radio access network element and the user equipment; and determine whether to switch from a first traffic routing mode to a second traffic routing mode based on the probe packet response from the user equipment. In the first traffic routing mode, downlink traffic from an server is delivered to the user equipment via a first data path through the selected wireless local area network access point. In the second traffic routing mode, the downlink traffic from the server is delivered to the user equipment via a second data path including the established IP tunnel between the radio access network element and the user equipment through the selected wireless local area network access point.

The first data path may not traverse the radio access network element.

The probe packet response may include a set of the plurality of probe packets echoed back from the user equipment to the radio access network element, an estimated available bandwidth for the user equipment at the selected wireless local area network access point, and a number of transmitted probe packets not received at the user equipment.

The processor may be further configured to execute computer readable instructions to cause the radio access network element to: measure a round trip time delay for the plurality of probe packets based on the set of the plurality of probe packets echoed back from the user equipment; and switch from the first traffic routing mode to the second traffic routing mode if (i) the number of transmitted probe packets not received at the user equipment is less than a probe packet loss threshold, (ii) the measured round trip time delay is less than a round trip time delay threshold, and (iii) the estimated available bandwidth is greater than a minimum throughput threshold.

The processor may be further configured to execute computer readable instructions to cause the radio access network element to: monitor the connection quality of the established IP tunnel between the radio access network element and the user equipment; and switch from the second traffic routing mode to a third traffic routing mode if the connection quality of the established IP tunnel falls below a minimum threshold quality. In the third traffic routing mode, the downlink traffic from the server is delivered to the user equipment via the second data path including the established IP tunnel between the radio access network element and the user equipment through the selected wireless local area network access point, and uplink traffic from the user equipment is delivered to the server via the second data path including the established IP tunnel between the user equipment and the radio access network element through the selected wireless local area network access point.

At least one other example embodiment provides user equipment comprising: a cellular interface configured to communicate with a radio access network element via a cellular link; a wireless local area network interface configured to communicate via a wireless local area network link; and a processor. The processor is configured execute computer readable instructions to cause the user equipment to: obtain, in response to instruction from the radio access network element, wireless local area network access point parameters from at least one wireless local area network access point; report the obtained local area network access point parameters to the radio access network element; establish a wireless local area network connection with a selected wireless local area network access point, from among the at least one wireless local area network access point, in response to a command from the radio access network element; and notify the radio access network element of the established wireless local area network connection with the selected wireless local area network access point.

The wireless local area network access point parameters may include service set identifiers, received signal strength indications and an estimated available bandwidth for the user equipment at the at least one wireless local area network access point.

The wireless local area network interface may be further configured to: receive a plurality of probe packets from the radio access network element via an IP tunnel between the radio access network element and the user equipment through the selected wireless local area network access point; and transmit a probe packet response to the radio network access element through the IP tunnel, the probe packet response being indicative of a connection quality of the IP tunnel.

The probe packet response may include a set of the received plurality of probe packets, an estimated available bandwidth for the user equipment at the wireless local area network access point, and a number of transmitted probe packets not received at the user equipment.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention.

Figure 1:
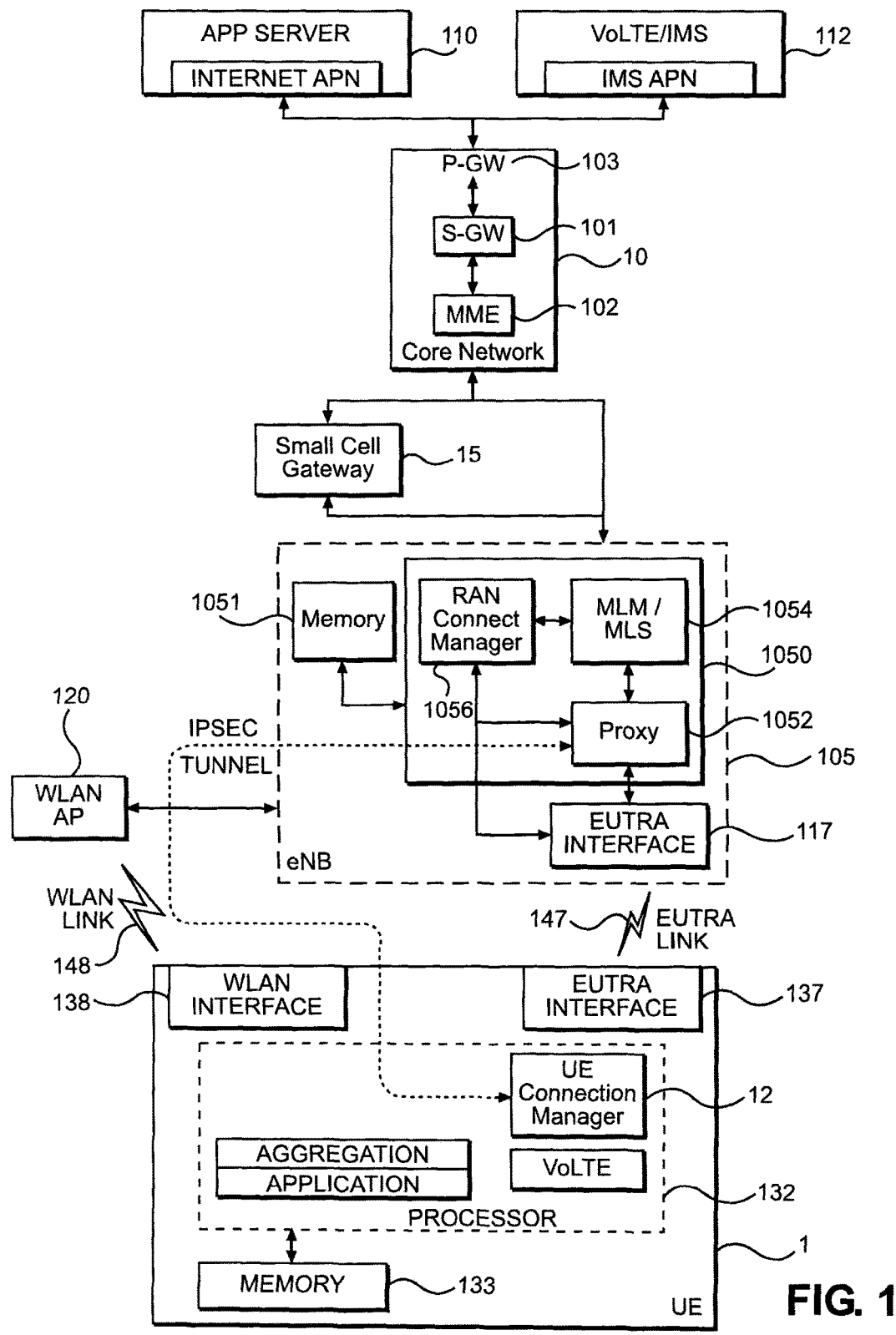
FIG. 1 shows a network architecture according to an example embodiment.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. This invention may, however, be embodied in many alternate forms and should not be construed as limited to only the embodiments set forth herein.

Accordingly, while example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at, for example, existing small wireless cells, base stations, NodeBs, gateways, servers, wireless or wireless local area network (WLAN) access points, wireless routers, WLAN gateways, user equipments (UEs), etc. Such existing hardware may include one or more Central Processing Units (CPUs), system-on-chip (SOC) devices, digital signal processors (DSPs), application-specific-integrated-circuits, field programmable gate arrays (FPGAs), computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium", "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

As used herein, the term "eNodeB" or "eNB" may be considered synonymous to, and may hereafter be occasionally referred to as a NodeB, base station, transceiver station, base transceiver station (BTS), macro cell, etc., and describes a transceiver in communication with and providing wireless resources to users in a geographical coverage area. As discussed herein, eNBs may have all functionally associated with conventional, well-known base stations in addition to the capability and functionality discussed herein.

As used herein, the term "small wireless cell" may be considered synonymous to, and may hereafter be occasionally referred to as a micro cell, pico cell, Home NodeB (HNB), Home eNodeB (HeNB), etc., and describes a transceiver in communication with and providing wireless resources (e.g., LTE, 3G, WiFi, etc.) to users in a geographical coverage area that is, in most cases, smaller than the geographical coverage area covered by the eNodeB and a macro cell. As discussed herein, small wireless cells may have all functionally associated with conventional, well-known base stations in addition to the capability and functionality discussed herein. Small wireless cells according to at least some example embodiments may also serve as WLAN access points (APs) providing WLAN resources for devices within range of the small wireless cell. Small wireless cells according to example embodiments will be discussed in more detail later.

The term "user equipment" or "UE" as discussed herein, may be considered synonymous to, and may hereafter be occasionally referred to, as user, client, client device, mobile unit, mobile station, mobile user, mobile, subscriber, user, remote station, access terminal, receiver, etc., and describes a remote user of wireless resources in a wireless communication network (e.g., a 3GPP LTE network) and/or a WLAN.

As discussed herein, a WLAN access point (WLAN AP) may be considered synonymous to, and may hereinafter be occasionally referred to as a wireless access point, wireless router, WiFi wireless router, etc., and describes a transceiver in communication with, and providing WLAN (e.g., WiFi) resources for, client devices in range of, and attached to, the WLAN AP. The WLAN AP allows wireless client devices (e.g., electronic devices having a WLAN transceiver) to connect to other (e.g., wireless and/or wired) networks, such as the Internet.

Generally, as discussed herein, a WLAN AP may be any well-known wireless access point, router, or other physical computer hardware system, including one or more processors, various communication interfaces (e.g., both wireless and wired), a computer readable medium, etc. The one or more interfaces may be configured to transmit/receive data signals via a wireless connection over a WLAN to/from one or more other devices, and also communicate with the Internet, for example over a wired connection.

Generally, as discussed herein, an eNB may be any well-known wireless cell including one or more processors, various communication interfaces (e.g., cellular and wired), a computer readable medium, memories, etc. The one or more interfaces may be configured to transmit/receive data signals via wireless connections over a cellular network to/from one or more other devices, and also communicate with the Internet, for example over a wired connection.

As discussed herein, application services may refer to services provided in a cellular (e.g., a EUTRA network, such as a 3GPP LTE network) and/or a WLAN (e.g., a WiFi network). In one example, application services may include voice over Internet Protocol (VoIP), multimedia applications, including audio and/or video content, web browsing, instant messaging, email download, software download or any other IP based service delivered to a mobile or other device using 3GPP and/or WLAN access.

According to example embodiments, packet data network (PDN) gateways (P-GW), serving gateways (S-GW), UEs, application/proxy servers, small wireless cells, eNBs, WLAN APs, etc. may be (or include) hardware, firmware, hardware executing software or any combination thereof. Such hardware may include one or more CPUs, SoC devices, DSPs, ASICs, FPGAs, computers, or the like configured as special purpose machines to perform the functions described herein as well as any other well-known functions of these elements. In at least some cases, CPUs, SoCs, DSPs, ASICs and FPGAs may generally be referred to as processing circuits, processors and/or microprocessors.

FIG. 1 shows a network architecture according to an example embodiment. The example embodiment shown in FIG. 1, as well as other example embodiments, will be discussed with regard to an Evolved Universal. Mobile Telecommunications System (UMTS) Terrestrial Radio Access (EUTRA) network, EUTRA interfaces, EUTRA stacks, EUTRA links, etc. However, it should be understood that these elements may also be more generally referred to as cellular network, cellular interfaces, cellular stacks, cellular links, etc. Example embodiments may be applicable to access networks other than EUTRA networks.

The network architecture shown in FIG. 1 includes: an application or proxy server 110; a VoLTE/IMS server 112; an eNB 105; core network elements 10; a small cell gateway 15; and a WLAN AP 120. The eNB 105 may be a small wireless cell. If the eNB 105 is not a small wireless cell, then the small cell gateway may be omitted. As discussed herein, the eNB 105 (as well as any portion thereof), the WLAN AP 120 (as well as any portion thereof), and the small cell gateway 15 (as well as any portion thereof), and/or any combination thereof, may be referred to herein as a radio access network (RAN) element.

The core network 10 includes, inter alia, a P-GW 103, a S-GW 101, and a MME 102, which are well-known in the art. Because each of these components is generally well-known, a detailed discussion is omitted.

Referring to FIG. 1, if included, the small cell gateway 15 facilitates regular EUTRA (e.g., LTE) signaling between the eNB 105 and the core network 10 for functions such as: multimedia management entity (MME) session establishment, default Internet Protocol (IP) assignment, local gateway (e.g., via Selected Internet IP Traffic Offload (SIPTO) and/or Local IP Access (LIPA)) connection establishment, etc.

The application server 110 may be a web server that hosts multimedia content (e.g., voice, video, etc.). In another example, the application server 110 may be a web server, an instant messaging server, an email server, a software and/or cloud server, or any other Internet Protocol (IP)-based service deliverable to a mobile or other device using cellular access and/or non-cellular access (e.g., WLAN, WiFi, etc.). In this regard, downlink data traffic may include a webpage, a video, an email, an instant message, or the like, which originates at the application server 110, and is sent to the eNB 105 via the core network 10. Uplink data traffic may include a request for a webpage, a request for a video, an email, an instant message, upload of a video, or the like.

The application server 110 may communicate with the eNB 105 over a Transport Control Protocol (TCP) connection through one or more packet data networks.

The VoLTE/IMS server 112 may be a Voice over Internet Protocol (VoIP) server providing VoIP (e.g., VoLTE) services to users in the network. In one example, the downlink data traffic may include one direction of a VoIP call, one direction of a video call, or the like, from the VoLTE/IMS server 112. Uplink data traffic may include another direction of a VoIP call, another direction of a video call, or the like. In the example shown in FIG. 1, the VoLTE/IMS server 112 may communicate with the eNB 105 over a TCP connection through one or more packet data networks.

Still referring to FIG. 1, the eNB 105 provides wireless resources (e.g., 3G, LTE, etc.) and radio coverage for UEs including UE 1 shown in FIG. 1. In the example embodiment shown in FIG. 1, the eNB 105 is configured to provide EUTRA-based wireless resources and radio coverage for UEs. In this regard, the eNB 105 may serve as a wireless cell. For clarity, only one UE and one eNB are illustrated in FIG. 1. However, any number of UEs may be connected to the eNB 105, and the communication system may include any number of eNBs. The application server 110 and/or the VoLTE/IMS server 112 may communicate with one or more eNBs concurrently and/or simultaneously.

The UE 1 is a user device that supports both EUTRA-based and WLAN-based communications. For example, the UE 1 may be a smartphone, a tablet computer, a laptop, a personal digital assistant (PDA), or the like. As shown in FIG. 1, the UE 1 includes: a processor 132; a memory 133; an EUTRA interface 137; and a WLAN interface 138. The processor 132 is communicatively connected to each of the memory 133, the EUTRA interface 137, and the WLAN interface 138. The memory 133 stores programs that may be executed by the processor 132 to provide various functions of the cellular-WLAN integration capability discussed herein. It will be appreciated that the implementation of UE 1 depicted in FIG. 1 is merely an example, and that UE 1 may be implemented in any other manner suitable for providing functions of the cellular-WLAN integration capability.

The processor 132 may include a UE connection manager (UCM) 12. Example functionality of the UE 1, including the UCM 12, will be discussed in more detail later with regard to FIGS. 2-7.

Still referring to FIG. 1, the eNB 105 includes: a memory 1051; a processor 1050; and an EUTRA interface 117. The processor 1050 is communicatively connected to the memory 1051 and the EUTRA interface 117. The processor 1050 includes: an IP proxy 1052; a multi-link manager/multi-link scheduler (MLM/MLS) 1054; and a radio access network (RAN) connection manager (RCM) 1056.

The IP proxy 1052 manages multiple radio technology (e.g., WLAN, EUTRA, etc.) links at the eNB 105. More specifically, for example, the IP proxy 1052 may redirect downlink data traffic intended for the UE 1 via the WLAN AP 120 and the WLAN link 148. The IP proxy 1052 also intercepts uplink data traffic from the IP tunnel between the WLAN AP 120 and the eNB 105. The IP proxy 1052 is operatively coupled to the MLM/MLS 1054.

The MLM/MLS 1054 switches the transmission of data packets to the UE 1 between the WLAN link 148 and the EUTRA link 147. In one example, the MLM/MLS 1054 selectively distributes downlink data traffic among the WLAN link 148 and the EUTRA link 147 at the direction of the RCM 1056. The MLM/MLS 1054 also holds a retransmission buffer, inserts probe packets, queues data and provides egress shaping on Ethernet ports, as discussed in more detail below.

Still referring to FIG. 1, the eNB 105 includes the EUTRA interface 117 to communicate with the UE 1 via an EUTRA link 147 between the EUTRA interface 117 at the eNB 105 and the EUTRA interface 137 at the UE 1. According to one or more example embodiments, the EUTRA link 147 may be a wideband radio frequency implementation using, for example, Orthogonal Frequency Division Multiple Access (OFDMA) and Single Carrier Frequency Division Multiple Access (SCFDMA) in the downlink and uplink directions, respectively. The EUTRA link 147 may be based on either Frequency Division Duplexing (FDD) or Time Division Duplexing (TDD). The EUTRA link 147 may also be based on scheduled access for user data such that the EUTRA link 147 is understood to be a scheduled, contentionless link (i.e., all downlink and uplink user plane transmissions for UE 1 via the EUTRA link 147 are scheduled by the eNB 105). The eNB 105 may be configured to communicate via the EUTRA link 147 using existing procedures for use by wireless cells (e.g., a macro cell, micro cell, pico cell, eNodeB, eNB, HeNB, etc.) to communicate via a EUTRA air interface. The eNB 105 is also communicatively coupled to the WLAN AP 120 via an external interface through a local IP tunnel (e.g., an IPSec tunnel). The WLAN AP 120 communicates with the UE 1 through a WLAN interface (not shown) via the WLAN link 148. The eNB 105 may establish the IP tunnel with the WLAN AP 120 for the UE 1 as discussed in more detail later. Moreover, because WLAN APs, such as the WLAN AP 120, are well-known a more detailed discussion of this component is omitted.

The WLAN link 148 is a time-shared channel using a polite access protocol (e.g., Carrier Sense Multiple Access (CSMA)). According to the CSMA mechanism, each potential transmitter, including the WLAN AP 120 and the UE 1, vies for use of the channel for both uplink and downlink transmissions and defers transmission until the channel is deemed to be clear. The WLAN AP 120 may be configured to communicate via the WLAN link 148 using existing procedures for use by a WLAN AP to communicate using one or more WLAN (e.g., WiFi) channels. The WLAN link 148 between the WLAN AP 120 and the UE 1 in FIG. 1 is a contention-based link.

As discussed above, the processor 1050 includes the RCM 1056. The RCM 1056 interfaces with the IP proxy 1052 to provide input based on radio link states (e.g., states of the IP tunnel, the WLAN link 148 and/or the EUTRA link 147) between the UE 1, the WLAN AP 120 and the eNB 105. The IP proxy 1052 controls distribution (or allocation) of downlink data traffic among the WLAN and EUTRA links to the UE 1 at the direction of the RCM 1056. Operation of the RCM 1056 will be discussed in more detail later with regard to FIGS. 2-7.

For downlink data traffic from the eNB 105 that is intended for delivery to the UE 1, the WLAN AP 120, the eNB 105 and the UE 1 are configured to support concurrent and/or simultaneous delivery of the downlink data traffic via the EUTRA link 147 and the WLAN link 148.

Functionality of the components of the network architecture shown in FIG. 1 will be discussed in more detail later.

At least some example embodiments provide methods and/or devices for fast link selection. In a method of fast link selection according to at least one example embodiment, the RCM probes a wireless local area network (WLAN) channel initially before use; tracks on-going sessions to generate delay and throughput statistics; detects possible outages by mining probe responses from UEs; may achieve long term load balancing; and may be transparent to upper layer network protocols (e.g., Transport Control Protocol (TCP)), and the applications by retransmitting outstanding packets and handling reordering at the UE.

At least some example embodiments utilize what is referred to herein as active probing. Active probing is used to determine the suitability of cellular (e.g., EUTRA, such as 3GPP LTE) and WLAN (e.g., Wi-Fi) links and track performance of these links during ongoing sessions.

With regard to FIG. 1, according to at least one example embodiment, the RCM 1056 generates and time stamps management probing packets (also referred to herein as probe packets or management probe packets), and forwards the generated management probing packets to the MLM/MLS 1054. The MLM/MLS 1054 inserts the generated management probing packets into an IP data packet stream intended for the UE 1 via the IP proxy 1052.

Upon receipt at a UE 1, the IP layer timestamps the received management probing packets and returns the management probing packets to the RCM 1056 to allow the RCM 1056 to compute downlink one-way delays between the eNB 105 and the UE 1. Thereafter, the UCM 12 acknowledges reception of each of the management probing packets by sending a probe packet response to the RCM 1056 over the EUTRA link 147.

Upon receipt of the probe packet response, the RCM 1056 increments the retransmission buffer pointer so that the buffer contains only unacknowledged data through probing. The RCM 1056 also computes throughput statistics, as will be described in more detail later.

According to at least some example embodiments, if the RCM 1056 determines that the WLAN link 148 is congested (e.g., due to traffic, fading, interference, etc.), then the RCM 1056 may switch downlink paths from the WLAN link 148 to the EUTRA link 147. Subsequently, if the RCM 1056 determines that WLAN link 148 is again suitable for transmission to the UE 1, then the RCM 1056 may switch paths from the EUTRA link 147 to the WLAN link 148.

For example purposes, example embodiments will be discussed herein under the assumption that voice traffic on Quality Control Indicator (QCI) 1 is continually transmitted on the EUTRA link 147, while best effort (BE) traffic on QCI 6-9 is switched (or distributed) between EUTRA and WLAN links 147 and 148.

As discussed herein, with regard to a UE, the network may operate in one of a WLAN only mode, an EUTRA only mode, a boost mode, and a WLAN (UL) only mode. As discussed herein the EUTRA only mode may also be referred to as the LTE or cellular only mode.

In the WLAN only mode, the EUTRA data path is ignored, and only the WLAN interface is utilized from the user's point of view. For example, downlink traffic from a server is delivered to the UE 1 via a data path through the WLAN AP 120. The data path does not traverse the eNB 105. In the EUTRA only mode, the data path is provided through the EUTRA interface. In the boost mode, downlink data flows through the IP tunnel from the eNB 105 to the UE 1 via the WLAN AP 120 and WLAN link 148, while uplink data flows via the EUTRA path. In WLAN (UL) both uplink and downlink flow through the tunneled path.

Figure 2:
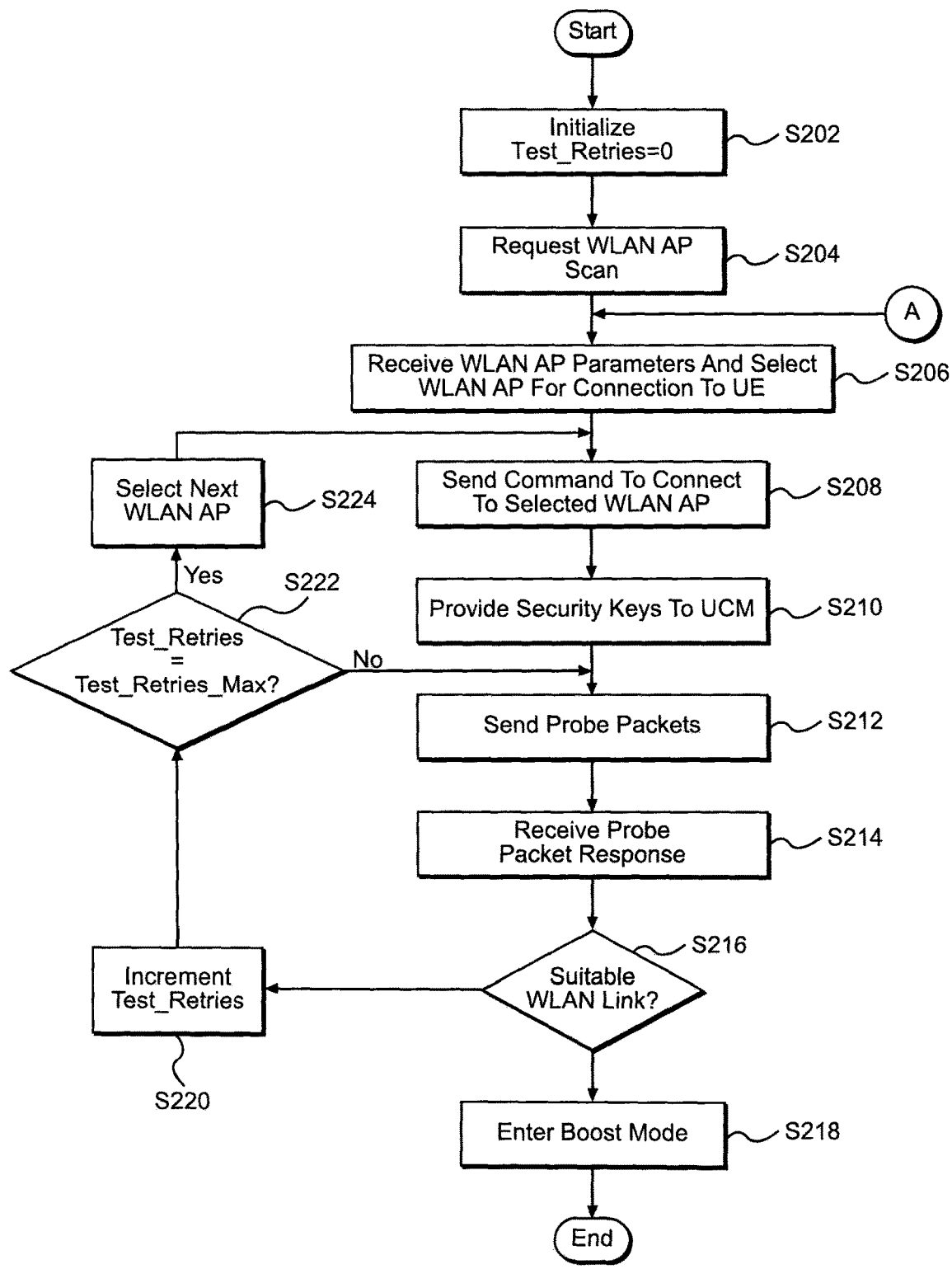
FIG. 2 is a flow chart illustrating example operation of radio access network connection manager (RCM) in connection with a method for determining whether a user equipment (UE) should utilize the boost mode.

FIG. 2 is a flow chart illustrating example operation of the RCM 1056 in connection with a method for fast switching between different radio link technologies, according to an example embodiment. The method shown in FIG. 2 will be described with regard to the network architecture shown in FIG. 1 for example purposes. However, example embodiments should not be limited to only this example implementation.

Referring to FIGS. 1 and 2, when the UE 1 enters the coverage area of the eNB 105, the UE 1 attaches to the eNB 105 through a conventional random access procedure. Because such random access procedures are well-known, a detailed discussion is omitted. Once having attached to the eNB 105, the RCM 1056 enters the EUTRA-only mode for the UE 1.

While in the EUTRA-only mode, at step S202 the RCM 1056 initializes a retry counter test_retries to 0 (test_retries=0).

After initializing the retry counter test_retries, at step S204 the RCM 1056 requests that the UE 1 perform a scan of WLAN APs in the area (e.g., a Wi-Fi scan) to obtain beacon information of the surrounding WLAN APs. The UCM 12 receives the scan request from the RCM 1056, and initiates a request through the OS connection manager or other system application programming interface (API). As is known, this beacon information includes service set identifiers (SSIDs) and received signal strength indications (RSSIs) for the surrounding WLAN APs.

At step S206, the RCM 1056 receives WLAN AP parameters for each of the WLAN APs identified by the UE 1 during the scan ordered by the RCM 1056. As discussed herein, the WLAN AP parameters may include a SSID, RSSI, and an estimated available $BW_A$ for a given WLAN AP. As discussed in more detail later with regard to FIG. 4, the estimated available $BW_A$ for a given WLAN AP may be calculated at the UE 1.

Still referring to step S206, the RCM 1056 selects a WLAN AP to which the UE 1 should connect based on the reported WLAN AP parameters for the identified WLAN APs. In one example, the RCM 1056 creates an ordered list of WLAN APs detected by the UE 1 based on the received RSSI or single user throughput for each of the WLAN APs. The RCM 1056 then selects the WLAN AP having the highest RSSI or single user throughput as the WLAN AP to which the UE 1 should connect for a WLAN connection. In this example, single user throughput is the channel bandwidth times the rate in bits-per-second (bps) times a factor for the overhead. According to at least some example embodiments, a load balancing algorithm may also be used in selecting the WLAN AP at step S206 such that the RCM 1056 gives preference to less loaded WLAN APs when selecting a WLAN AP for connection by the UE 1. In one example, the load balancing algorithm may be a greedy load balancing algorithm. In an example of a basic greedy load balancing algorithm, each user selects a WLAN AP (k*) that is best for him/herself evaluating the projected user throughput of the WLAN APs in the set K, where the k-th throughput is $$\frac{MCS(k) \times \text{channel\_BW}(k)}{N(k)+1},$$

where IN is the current number of users at WLAN AP k. Additionally, if the UE 1 is not within range of any WLAN APs when the WLAN scan is requested by the RCM 1056, then the UE 1 remains attached to the eNB 105 and data is routed via the EUTRA link 147. For the sake of this discussion, it is assumed that the RCM 1056 selects the WLAN AP 120 at step S206 in FIG. 2.

Still referring to FIG. 2, at step S208 the RCM 1056 sends a command to the UE 1 instructing the UE 1 to connect to the WLAN AP 120. In one example, the RCM 1056 sends a command to the UCM 12, which then communicates to the OS connection manager. Once the UE 1 is connected to the WLAN AP 120, the UCM 12 informs the RCM 1056 of successful connection to the WLAN AP 120. The OS connection manager provides an indication of successful connection to the WLAN AP, which is read by the UCM 12.

In response to receiving the indication that the UE 1 has successfully connected to the WLAN AP 120, at step S210 the RCM 1056 provides security keys to the UCM 12, and a local IP tunnel (e.g., an IPSec tunnel) is created between the eNB 105 and the WLAN AP 120 for transmitting downlink data traffic to the UE 1. According to one or more example embodiments, the security keys are transferred over the secure EUTRA link 147.

After having established the IP tunnel between the eNB 105 and the WLAN AP 120, the RCM 1056 enters an initialization phase in which the RCM 1056 determines whether to enter the boost mode for transmitting downlink data traffic to the UE 1 via the WLAN.

In more detail with regard to FIG. 2, at step S212 the RCM 1056 sends a train of management probe packets to the UE 1 through the IP tunnel via on the WLAN link 148 and the WLAN AP 120.

The RCM 1056 generates and time stamps probe packets, and then outputs the time stamped probe packets to the MLM/MLS 1054.

The MLM/MLS 1054 inserts the time stamped probe packets into the downlink IP data packet stream being transmitted to the UE 1 through the IP tunnel on the WLAN link 148 via the IP proxy 1052.

By time stamping each probe packet as it leaves the RCM 1056, the RCM 1056 may measure of downlink one-way and/or round trip time (RTT) delay between the eNB 105 and the UE 1 via the WLAN link 148 as discussed in more detail later. Each probe packet includes a sequence number that is incremented by one for each probe packet.

Figure 5:
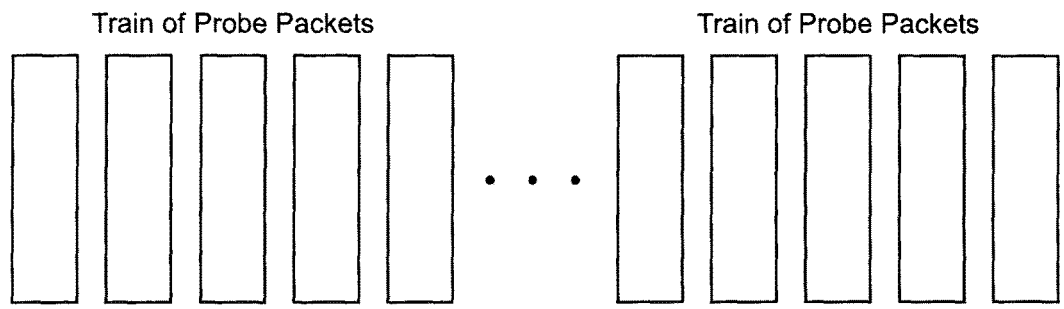
FIG. 5 illustrates an example train of probe packets inserted into a downlink IP data packet stream destined for a UE.

FIG. 5 illustrates an example train of probe packets inserted into the downlink IP data packet stream destined for the UE 1.

The train of probe packets may be interspersed regularly between the data packets destined for the UE. In one example, the probe packets may be spaced apart at regular intervals. For example, the RCM 1056 may send a number of probe packets num_test_packets at a given rate test_rate for a testing interval test_duration. In one example, the transmission rate for the probe packets test_rate may be set to $2 \times THP_{min}$, and the testing interval test_duration may be set between about 50 and 500 milliseconds (ms). In this example, $THP_{min}$ is the minimum throughput target for the UE 1 in bits-per-second (e.g., a minimum Quality of Experience (QoE) input/target). In one example, the $THP_{min}$ may be about 1 Mbps, and num_test_packets may be about 100 test packets.

The number of test packets num_test_packets, the transmission rate for the probe packets test_rate, and the testing interval test_duration may be configured by a user based on experimental results and/or empirical data. The test configuration may be sent in the probe packets repeatedly over the WLAN link 148 or sent by RCM 1056 to UCM 12 via EUTRA interface 147.

Figure 6:
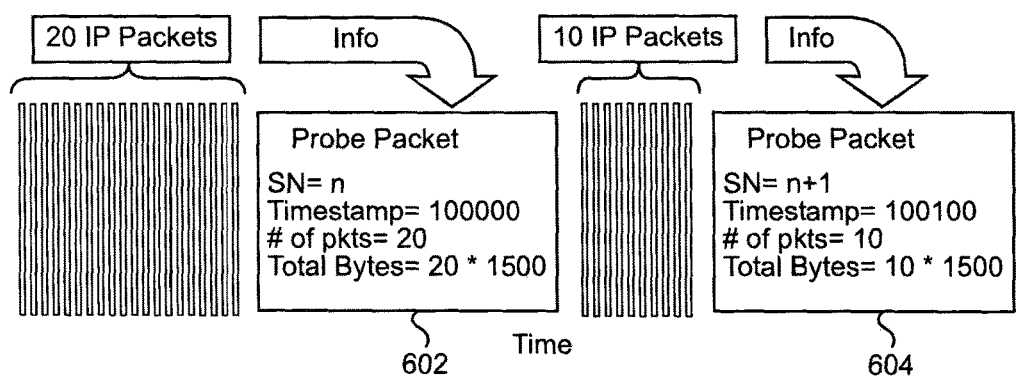
FIG. 6 illustrates an example of two probe packets in a train of probe packets generated by a RCM.

FIG. 6 illustrates an example of two probe packets in a train of probe packets generated by the RCM 1056.

Referring to FIG. 6, each of the probe packets 602 and 604 includes a sequence number SN, a time stamp Timestamp, an indication of the number of IP packets left in the buffer at the time of transmission of the probe packet, and a total number of bytes remaining in the buffer at the time of transmission of the probe packet. Including the total number of bytes left in the buffer between the probe packets allows for throughput measurements, such as bytes transferred over time.

Returning to FIG. 2, at step S214 the RCM 1056 receives a probe packet response from the UCM 12. In at least one example embodiment, the probe packet response from the UCM 12 includes: a set of probe packets echoed back from the UE 1 to support RTT measurement; and probe packet response information such as the estimated available bandwidth $BW_A$ calculated at the UCM 12, and a number of transmitted probe packets not received at the UCM 12. The set of probe packets may be a set of a number of first packets (e.g., the first 10 probe packets) sent by the RCM 1056 to the UCM 12. The echoing back of probe packets from the UE 1 to the RCM 1056 will be discussed in more detail later with regard to FIGS. 4 and 7.

At step S216, the RCM 1056 determines whether the IP tunnel between the eNB 105 and the UE 1 including the WLAN link 148 is suitable for the boost mode based on the received probe packet response and delay statistics for the UE 1. In one example, the RCM 1056 determines whether the WLAN link 148 is suitable for boost mode operation based on the number of missing probe packets num_missing_probes, the measured RTT, and the received available bandwidth $BW_A$ for the UE 1. In a more specific example, the RCM 1056 determines that the WLAN link 148 is suitable for boost mode operation if the number of missing probe packets num_missing_probes is less than the probe packet loss threshold $PrLoss_{max}$, the measured RTT for the UE 1 is less than a maximum RTT threshold $RTT_{max}$ and the available bandwidth $BW_A$ is greater than the minimum throughput threshold $THP_{min}$. If these criteria are met, then the RCM 1056 determines that the IP tunnel (and the WLAN link 148) to the UE 1 is suitable for boost mode operation, and the RCM 1056 enters and utilizes the boost mode for transmissions to the UE 1 on the downlink. In one example, the probe packet loss threshold $PrLoss_{max}$ may be about 1 probe packet, and the maximum RTT threshold $RTT_{max}$ may be about 0.5 second.

According to at least one example embodiment, the RCM 1056 performs an RTT measurement based on the set of probe packets echoed back from the UE 1. In one example, the RCM 1056 listens for the echoed back probe packets, which have a known transmission time stamp and sequence number, on a given port (e.g., UDP port 50000). Upon receipt of the echoed back probe packets, the RCM 1056 measures the RTT for the echoed back probe packets based on the transmission time stamp and reception time for each of the echoed back probe packets.

The RCM 1056 also calculates delay statistics for the WLAN link 148 in response to the probe packet response from the UCM 12. In one example, the delay statistics may include an average and variance of the RTT delay for the UE 1.

Returning to step S216, if the above-mentioned criteria are not met, then the RCM 1056 determines that the IP tunnel (and WLAN link 148) to the UE 1 is not suitable for boost mode operation. In this case, the RCM 1056 increments the retry counter (test_retries=test_retries+1) at S220.

At step S222, the RCM 1056 determines whether the value of the test retry counter test_retries is equal to a maximum value test_retries_max. In one example, the maximum value test_retries_max may be about 4.

If the RCM 1056 determines that the value of retry counter test_retries is equal to the maximum value test_retries_max at step S222, then at step S224 the RCM 1056 selects a next WLAN AP in the list of WLAN APs generated at step S206. The process then proceeds to step S208 and continues as discussed above, but with regard to the newly selected WLAN AP. If there are no other WLAN APs to be selected at step S224, then the process terminates until the UE 1 detects another WLAN AP.

Returning to step S222, if the RCM 1056 determines that the value of retry counter test_retries is less than the maximum value test_retries_max at step S222, then the process proceeds to step S212 and continues as discussed above for a subsequent set of probe packets.

If the RCM 1056 utilizes the boost mode for the UE 1, then the data flow (e.g., best effort traffic) to the UE 1 on the downlink is routed through the IP tunnel to the WLAN AP 120 and sent to the UE 1 on the WLAN link 120. In the boost mode, the data routed from the eNB 105 to the WLAN AP 120 for transmission to the UE 1 on the WLAN link 148 remains buffered at the eNB 105 until the eNB 105 receives an acknowledgement from the UE 1 that these packets have been received. The acknowledgement may be sent to the eNB 105 on the uplink over the EUTRA link 147.

While operating in the boost mode, the RCM 1056 continually monitors the quality of the IP tunnel between the eNB 105 and the UE 1 via the WLAN AP 120 using probe packets inserted in the downlink data stream to the UE 1. If the quality of the IP tunnel falls below a quality suitable for boost mode operation, then the RCM 1056 may cause the network to exit the boost mode for the UE 1, and enter the EUTRA only mode in which uplink and downlink traffic is transmitted between the eNB 105 and the UE 1 over the EUTRA link 147, rather than through the IP tunnel.

Figure 3:
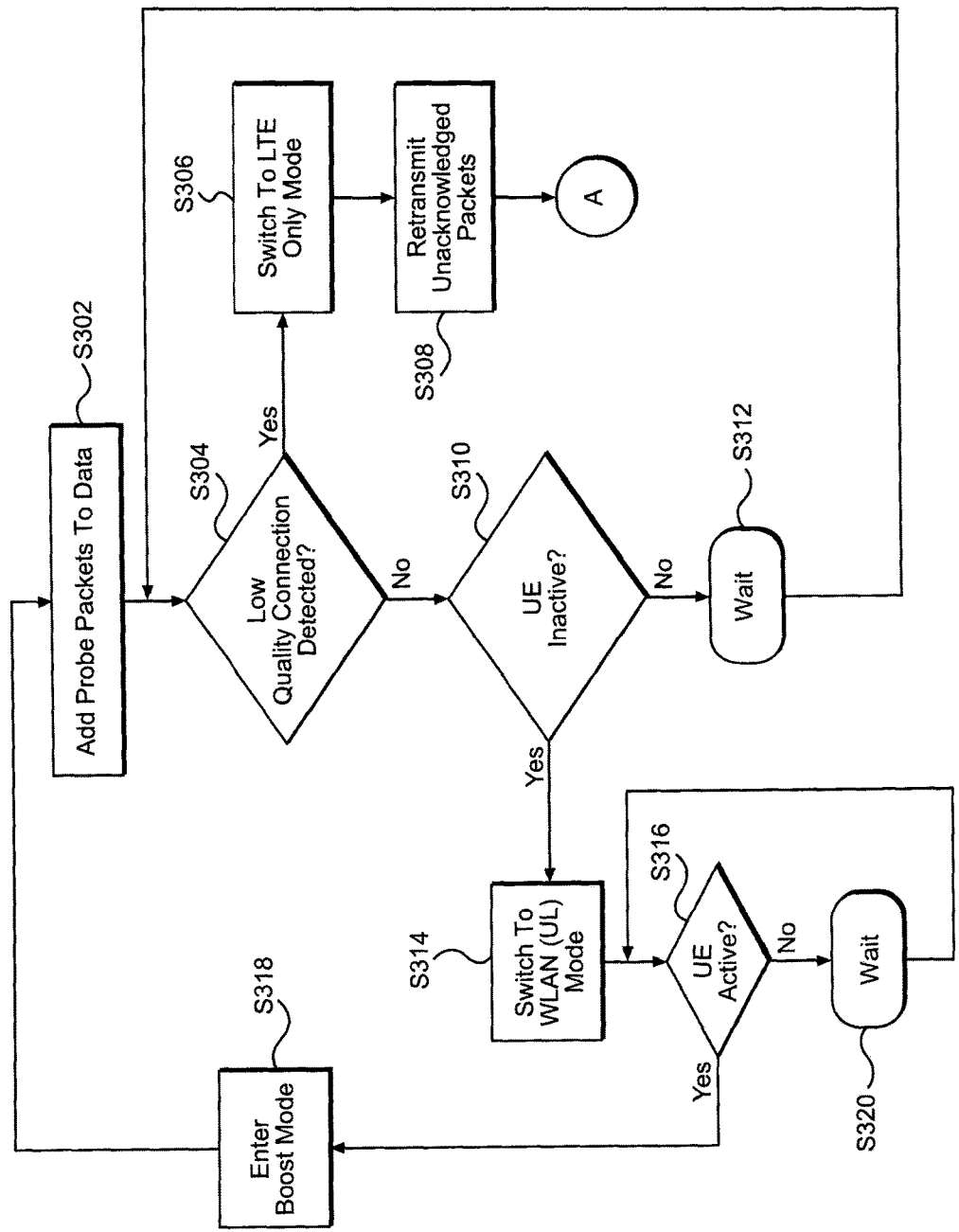
FIG. 3 is a flow chart illustrating an example embodiment of a method for fast link switching in conjunction with the boost mode.

FIG. 3 is a flow chart illustrating an example embodiment of a method for fast link switching while operating in the boost mode. As with the method shown in FIG. 2, the method shown in FIG. 3 will be described with regard to the network architecture shown in FIG. 1.

Referring to FIGS. 1 and 3, once having entered boost mode operation for the UE 1, the RCM 1056 begins inserting probe packets into the downlink data stream transmitted to the UE 1. In one example, the RCM 1056 inserts probe packets into the downlink data stream at regular intervals (e.g., every B bytes). In one example, B may be about 50 Kbytes. The probe packets received at the UCM 12 are returned (e.g., reflected or echoed back) to the RCM 1056 to inform the RCM 1056 of successful transmission to the UE 1 through the IP tunnel on the downlink.

According to at least some example embodiments, as long as the quality of the connection between the eNB 105 and the UE 1 via the WLAN AP 120 remains above a minimum threshold quality, the RCM 1056 may continue boost mode operation (remain in the boost mode) for the UE 1.

If the RCM 1056 detects that the quality of the connection has fallen below the threshold at step S304 in FIG. 3, then the RCM 1056 exits the boost mode and enters the EUTRA only mode at step S306. As discussed above, in the EUTRA only mode data flows through the EUTRA path only on both the uplink and downlink.

In one example, the RCM 1056 determines that the quality of the connection has fallen below a minimum threshold quality if the average traffic activity $U_{avg}$ is below the minimum user through target $THP_{min}$, and the difference between the measured available bandwidth $BW_A$ and the measured average traffic activity $U_{avg}$ for the UE 1 is less than the bandwidth headroom $BW_{HR}$ for the UE 1 (i.e., $BW_A - U_{avg} < BW_{HR}$). The average traffic activity $U_{avg}$ is a short term measured average user traffic activity in bits-per-second, which may be measured at the UCM 12 and fed back to the RCM 1056 along with acknowledgement packets. The measured available bandwidth $BW_A$ may be in bits-per-second, and may be obtained from bandwidth testing. The bandwidth headroom $BW_{HR}$ for the UE 1 is also in bits-per-second, and is utilized as a parameter for low-rate state and bandwidth testing. The bandwidth headroom $BW_{HR}$ is related to the minimum bit-rate of the minimum user through target $THP_{min}$ as $f(THP_{min}, U_{avg})$ and is the amount of bandwidth necessary to allow the user to grow usage to meet target $THP_{min}$.

In another example, the RCM 1056 determines that the quality of the connection has fallen below the minimum threshold quality at step S304 if X consecutive probe packets are not returned from the UCM 12 in a given time period. In more detail, the RCM 1056 determines that the quality of the connection has fallen below the threshold, if the RTT for the X probe packets inserted into the data packet stream exceeds a RTT threshold $RTT_{max}$. In one example, X may be about 3, and the RTT threshold $RTT_{max}$ may be about 100 ms.

If the user data rate remains above a minimum threshold value $U_{min}$, but below the minimum user throughput target $THP_{min}$, then the link quality test may be performed a set number of times periodically. In one example, the RCM 1056 may perform the link quality tests mentioned above a number of times (e.g., num_low_rate_bwtest_retries=5) at regular intervals (e.g., every low_data_rate_bwtest_interval interval=10 seconds). In this example, $U_{min}$ is a minimum user traffic activity in bits-per-second, which distinguishes between low level background network traffic and UE initiated activity.

When the UE 1 is switched to the EUTRA only mode at step S306, the unacknowledged packets in the retransmission buffer at the eNB 105 are retransmitted to the UE 1 on the EUTRA link 147. At this time the UCM 12 may receive packets over both WLAN link 148 and the EUTRA link 147 for a relatively short period of time. In this case, the UCM 12 may need to order the received packets and discard duplicate packets to avoid fallacious duplicate TCP acknowledgement (ACK) packets and corresponding retransmissions from the sender. To do so, the UCM 12 may utilize packet filtering based on 5-tuple (e.g., source address (src_addr), source port (src_port), destination address (dst_addr), destination port (dst_port), protocol type (protocol_type)) information and TCP sequence number, as a kernel module on the UE 1.

Still referring to FIG. 3, after retransmitting the unacknowledged packets, the process proceeds to step S206 in FIG. 2 and continues in a manner similar to that discussed above to determine whether to re-enter the boost mode for downlink transmissions to the UE 1, except for the following modifications.

In this example, at step S206, the RCM 1056 may select a WLAN AP for the UE 1 based on a load balancing algorithm that uses, for example: i) the set of reported WLAN AP parameters including at least the SSID and RSSI, and optionally the available bandwidth $BW_A$; ii) the strongest RSSI metric among the reported WLAN AP parameters; and iii) the available statistics from UEs connected to the WLAN APs that are candidates for connection by UE 1. Since, in this case, the RCM 1056 has knowledge of the throughput of all UEs connected to each managed WLAN AP, the RCM 1056 may compute an average WLAN AP throughput, and then balance the load on the WLAN APs by giving preference to less loaded WLAN APs when selecting a WLAN AP for connection by the UE 1.

Also at step S206, the RCM 1056 may compute the expected throughput expected_throughput for the UE 1 when connected to the WLAN AP 120. In one example, the RCM 1056 estimates the modulation and coding scheme (MCS) for a WLAN AP based on the RSSI, and calculates the expected throughput expected_throughput according to Equation (1) shown below.

$$\text{expected\_throughput} = \frac{\text{raw\_throughput}(MCS)}{N\_active + 1} \quad (1)$$

In Equation (1), N_active is the active number of UEs connected to the WLAN AP and raw_throughput(MCS) is the throughput of the UE with the given MCS if there are no other users. If the expected throughput expected_throughput for the UE when connected to a given WLAN AP is less than the minimum threshold value $THP_{min}$, then the RCM 1056 may not select that WLAN AP and/or remove the WLAN AP from the list of WLAN APs available for connection by the UE.

Additionally, if the IP tunnel still exists, then the IP tunnel need not be re-established.

Although omitted with regard to this iteration, another WLAN AP scan may be requested by the RCM 1056 (step S204) prior to step S206 depending on the RSSI, and the most recent scan performed at the UE 12.

Returning to step S304 in FIG. 3, if the quality of the downlink between the eNB 105 and the UE 1 through the IP tunnel via the WLAN AP 120 is above a minimum threshold quality level, then the RCM 1056 may determine whether to exit the boost mode and enter a WLAN (UL) only mode based on whether the UE 1 is determined to be inactive at step S310. In the WLAN (UL) only mode, both uplink and downlink data packets are transmitted to the UE 1 over the WLAN link through the IP tunnel.

In more detail, at step S310 the RCM 1056 determines that the UE 1 is inactive if the average traffic activity $U_{avg}$ for the UE 1 falls below the minimum threshold value $U_{min}$ for a given time interval second_inactivity_interval. In one example, the time interval second_inactivity_interval may be about 1 second.

If the RCM 1056 determines that the UE 1 is inactive at step S310, then the RCM 1056 exits the boost mode and enters the WLAN (UL) only mode for the UE 1 at step S314.

Once having entered the WLAN (UL) only mode for the UE 1, the RCM 1056 determines whether the UE 1 has again become active at step S316. The RCM 1056 determines that the UE 1 is again active when the average traffic activity $U_{avg}$ for the given time interval rises back above the minimum threshold value $U_{min}$.

If the RCM 1056 determines that the UE 1 is still inactive at step S316, then the RCM 1056 waits for a given time period at step S320. After expiration of the time period at step S320, the process returns to step S316 and continues as discussed above. In one example, the given time period may be about 1 second.

Returning to step S316, if the RCM 1056 determines that the UE 1 is again active, then the RCM 1056 re-enters the boost mode for the UE 1 at step S318. The process then returns to step S302 and continues as discussed above.

Returning to step S310, if the RCM 1056 determines that the UE 1 has not become inactive, then the RCM 1056 waits for a given time period at step S312. After expiration of the given time period, the process returns to step S304 and continues as discussed above. In one example, the wait period at step S312 may be about 1 second.

Figure 4:
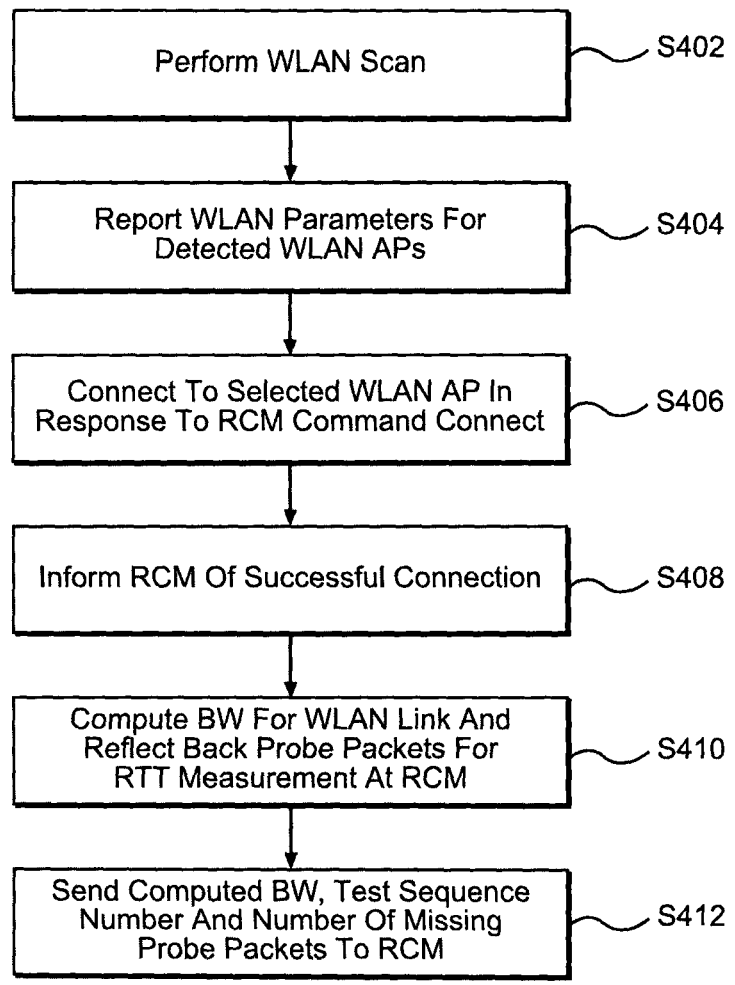
FIG. 4 is a flow chart illustrating example operation of a UE in connection with example embodiments of fast switching algorithms discussed herein.

FIG. 4 is a flow chart illustrating example operation of the UE 1 in connection with example embodiments of the fast switching algorithms discussed herein.

Referring to FIG. 4, at step S402, in response to the request from the RCM 1056 (step S204 in FIG. 2), the UE 1 performs a WLAN scan of WLAN APs in the area (e.g., a Wi-Fi scan) to obtain WLAN AP parameters for the WLAN APs surrounding the UE 1. As discussed above, the WLAN AP parameters for a given WLAN AP include a SSID, RSSI, and available bandwidth $BW_A$.

At step S404, the UE 1 reports the obtained WLAN AP parameters to the RCM 1056.

At step S406, the UE 1 connects to the WLAN AP selected by the RCM 1056 at step S206 in FIG. 2, and provided to the UE 1 in the RCM command sent at step S208 in FIG. 2. For example, the UE 1 establishes a wireless local area network connection with the selected WLAN AP 120.

Once having successfully attached to (established a WLAN connection with) the selected WLAN AP 120, the UE 1 informs the RCM 1056 of the successfully connection to the WLAN AP 120 at step S408.

After having informed the RCM 1056 of successful connection to the WLAN AP 120 at step S408, the UCM 12 begins receiving probe packets inserted into the downlink packet stream transmitted through the IP tunnel from the eNB 105 to the UE 1 via the WLAN AP 120.

In response to receiving a set of probe packets, at step S410 the UCM 12 computes the available bandwidth $BW_A$ for the WLAN AP 120. Also at step S410, the UE 1 echoes (or reflects) back the set of probe packets to the RCM 1056 for RTT measurement at the RCM 1056.

In one example, the UCM 12 computes compute the available bandwidth $BW_A$ for the WLAN AP 120 according to Equation (2) shown below.

$$BW_A = \frac{\text{test\_rate} \times \text{test\_duration}}{T_{end} - T_{start}} \quad (2)$$

In Equation (2), $T_{end}$ is the time of reception of the last probe packet in the set of probe packets, and $T_{start}$ is the receptiontime for the first probe packet in the set of probe packets. The test_rate (in Mbps) and test_duration (the transmission time) are the same as those discussed above with regard to FIG. 2.

The UE 1 may echo back the probe packets to the RCM 1056 using IP forwarding (Loopback Response). Alternatively, the UCM 12 may reflect the probe packets back to the RCM 1056 (UCM Response). A Loopback Response is transmitted from the UE 1 directly to the RCM 1056, whereas the UCM Response is transmitted to the RCM 1056 using a receiving port set up by the UCM 12.

According to one or more example embodiments, adding a timestamp to the probe packets at the UE 1 prior to being reflected back to the RCM 1056 is available for both response mechanisms if RFC 781 is used. The timestamp allows for the estimation of relatively accurate downlink one-way delay and throughput at the RCM 1056, when both clocks are synchronized.

If the Loopback Response mechanism is used for reflecting probe packets from the UCM 12, IP-forwarding should be enabled at the UE 1. If the UCM Response mechanism is used for reflecting probe packets, then upon the reception of a probe packet, the UCM 12 adds the previously received sequence number to the received probe packet for the RCM 1056 to identify, if necessary, whether a probe packet was lost on the uplink or downlink.

The probe packet response from the UCM 12 may also include information from the WLAN physical layer. Thereafter, the UCM 12 acknowledges the reception of a probe packet by reflecting back the probe packet to the RCM 1056.

According to at least some example embodiments, IP forwarding may be used to loop back probe packets from the UCM 12 via the IP tunnel back to the RCM 1056.

Returning to FIG. 4, at step S412 the UCM 12 sends the computed available bandwidth $BW_A$ for the WLAN AP 120 to the RCM 1056 along with a test sequence number test_seq_no and a number of lost probe packets.

According to at least some example embodiments, during active probing the RCM 1056 may maintain record of either RTT or downlink one-way delay for the UE using L1 and L3 filters, as will be discussed in more detail below with regard to FIG. 7.

Figure 7:
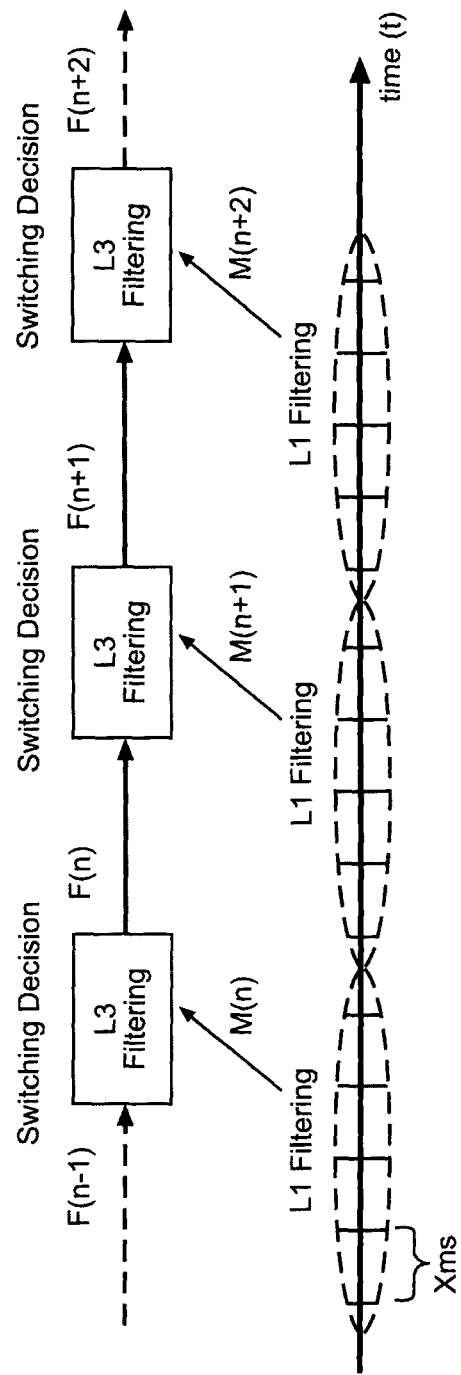
FIG. 7 illustrates an example L1 and L3 filtering procedure, according to an example embodiment.

FIG. 7 illustrates an example L1 and L3 filtering procedure, according to an example embodiment.

Referring to FIG. 7, the RCM 1056 may perform L1 and L3 filtering for each delay sample F, and make a switching decision as to whether to enter or exit the boost mode based on the filtered information.

In one example, the RCM 1056 filters RTT delay and throughput measurements to remove the effects of bursty traffic and interference from estimations.

With regard to the downlink one-way delay, for example, the RCM 1056 obtains an L1 delay sample M as the linear average over several delay samples estimated from a train (or group) of probe packets, as shown below in Equation (3).

$$M(n) = \frac{delay_{L1\_1} + \ldots + delay_{L1_a} + \ldots + delay_{L1\_A}}{A} \quad (3)$$

In Equation (3), $delay_{L1\_a}$ is the a-th probing delay sample obtained from the train of probe packets, and A is the number of probe packets in the train.

The calculated L1 delay sample M (n) is further averaged through a first-order infinite impulse response (IIR) filter, which outputs a L3 delay sample F with the periodicity of the probe packed train transmission, as shown below in Equation (4).

$$F(n) = (1-b) \times F(n-1) + b \times M(n) \quad (4)$$

In Equation (4), b is the L3 filter coefficient.

Based on the above-discussed filtering procedure combining delay and throughput statistics, the RCM 1056 may decide whether to exit or re-enter boost mode operation for the UE 1. That is, for example, the filtered metrics may be used in step S304 in FIG. 3. One or more example embodiments may provide higher quality of experience (QoE) and/or bit-rate to UEs by using the combination of cellular and WLAN networks.

The foregoing description of example embodiments has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

We claim:

1. A radio access network element configured to route traffic between an application server and user equipment, the radio access network element comprising:
    a cellular interface configured to communicate with the user equipment via a cellular link; and
    a processor configured to execute computer readable instructions to cause the radio access network element to
        transmit a plurality of probe packets to the user equipment via an IP tunnel between the radio access network element and the user equipment through a wireless local area network access point;
        receive a probe packet response from the user equipment, the probe packet response being indicative of a connection quality of the IP tunnel between the radio access network element and the user equipment; and
        determine whether to switch from a first traffic routing mode to a second traffic routing mode based on the probe packet response from the user equipment; wherein
            in the first traffic routing mode, downlink traffic from the application server is delivered to the user equipment via a first data path through the wireless local area network access point, and
            in the second traffic routing mode, the downlink traffic from the application server is delivered to the user equipment via a second data path including the IP tunnel between the radio access network element and the wireless local area network access point.

2. The radio access network element of claim 1, wherein the first data path does not traverse the radio access network element.

3. The radio access network element of claim 1, wherein, in the second traffic routing mode, uplink traffic from the user equipment is delivered to the application server via a third data path including the radio access network element and the cellular link.

4. The radio access network element of claim 1, wherein the probe packet response includes a set of the plurality of probe packets echoed back from the user equipment to the radio access network element, an estimated available bandwidth for the user equipment at the wireless local area network access point, and a number of transmitted probe packets not received at the user equipment.

5. The radio access network element of claim 4, wherein the processor is further configured to execute computer readable instructions to cause the radio access network element to
    measure a round trip delay time for the plurality of probe packets based on the set of the plurality of probe packets echoed back from the user equipment; and
    switch from the first traffic routing mode to the second traffic routing mode if (i) the number of transmitted probe packets not received at the user equipment is less than a probe packet loss threshold, (ii) the measured round trip delay time is less than a round trip delay time threshold, and (iii) the estimated available bandwidth is greater than a minimum throughput threshold.

6. The radio access network element of claim 5, wherein the processor is further configured to execute computer readable instructions to cause the radio access network element to
monitor the connection quality of the IP tunnel between the radio access network element and the user equipment; and
switch from the second traffic routing mode to a third traffic routing mode if the connection quality of the IP tunnel falls below a minimum threshold quality; wherein
in the third traffic routing mode, downlink traffic from the application server is delivered to the user equipment via a third data path including the cellular link between the radio access network element and the user equipment.

7. The radio access network element of claim 6, wherein the processor is further configured to execute computer readable instructions to cause the radio access network element to
determine whether the connection quality of the IP tunnel has fallen below the minimum threshold quality based on (i) an average traffic activity for the user equipment and (ii) a difference between the estimated available bandwidth and the average traffic activity for the user equipment.

8. The radio access network element of claim 5, wherein the processor is further configured to execute computer readable instructions to cause the radio access network element to
determine whether the user equipment has become inactive; and
switch from the second traffic routing mode to a third traffic routing mode if the user equipment is determined to be inactive; wherein
in the third traffic routing mode, the downlink traffic from the application server is delivered to the user equipment via the second data path including the IP tunnel between the radio access network element and the wireless local area network access point, and uplink traffic from the user equipment is delivered to the application server via the second data path including the IP tunnel between the radio access network element and the wireless local area network access point.

9. The radio access network element of claim 8, wherein the processor is further configured to execute computer readable instructions to cause the radio access network element to
determine whether the user equipment has become active; and
switch from the third traffic routing mode to the second traffic routing mode if the user equipment is determined to be active.

10. A radio access network element, comprising:
a cellular interface configured to receive, from a user equipment via a cellular link, wireless local area network access point parameters for a plurality of wireless local area network access points; and
a processor configured to execute computer readable instructions to cause the radio access network element to
select, from among the plurality of wireless local area network access points, a wireless local area network access point for the user equipment based on the received wireless local area network access point parameters,
instruct the user equipment to establish a wireless local area network connection with the selected wireless local area network access point,
establish an IP tunnel between the radio access network element and the user equipment through the selected wireless local area network access point, and
determine whether to switch from a first traffic routing mode to a second traffic routing mode based on a probe packet response from the user equipment; wherein
in the first traffic routing mode, downlink traffic from an application server is delivered to the user equipment via a first data path through the selected wireless local area network access point, and
in the second traffic routing mode, the downlink traffic from the application server is delivered to the user equipment via a second data path including the established IP tunnel between the radio access network element and the user equipment through the selected wireless local area network access point.

11. The radio access network element of claim 10, wherein the wireless local area network access point parameters include service set identifiers, received signal strength indications and an estimated available bandwidth for the wireless local area network access points.

12. The radio access network element of claim 10, wherein the processor is further configured execute computer readable instructions to cause the radio access network element to
transmit a plurality of probe packets to the user equipment via the established IP tunnel; and wherein
the probe packet response is indicative of a connection quality of the established IP tunnel between the radio access network element and the user equipment.

13. The radio access network element of claim 12, wherein the probe packet response includes a set of the plurality of probe packets echoed back from the user equipment to the radio access network element, an estimated available bandwidth for the user equipment at the selected wireless local area network access point, and a number of transmitted probe packets not received at the user equipment.

14. The radio access network element of claim 13, wherein the processor is further configured to execute computer readable instructions to cause the radio access network element to
measure a round trip delay time for the plurality of probe packets based on the set of the plurality of probe packets echoed back from the user equipment; and
switch from the first traffic routing mode to the second traffic routing mode in response to (i) the number of transmitted probe packets not received at the user equipment being less than a probe packet loss threshold, (ii) the measured round trip delay time being less than a round trip delay time threshold, and (iii) the estimated available bandwidth being greater than a minimum throughput threshold.

15. The radio access network element of claim 14, wherein the processor is further configured to execute computer readable instructions to cause the radio access network element to monitor the connection quality of the established IP tunnel between the radio access network element and the user equipment; and switch from the second traffic routing mode to a third traffic routing mode in response to the connection quality of the established IP tunnel falling below a minimum threshold quality; wherein in the third traffic routing mode, the downlink traffic from the application server is delivered to the user equipment via the second data path including the established IP tunnel between the radio access network element and the user equipment through the selected wireless local area network access point, and uplink traffic from the user equipment is delivered to the application server via the second data path including the established IP tunnel between the user equipment and the radio access network element through the selected wireless local area network access point.

16. The radio access network element of claim 10, wherein the first data path does not traverse the radio access network element.

17. A user equipment comprising:
a cellular interface configured to communicate with a radio access network element via a cellular link;
a wireless local area network interface configured to communicate via a wireless local area network link; and
a processor configured to execute computer readable instructions to cause the user equipment to
obtain, in response to instruction from the radio access network element, wireless local area network access point parameters from at least one wireless local area network access point,
report the obtained local area network access point parameters to the radio access network element,
establish a wireless local area network connection with a selected wireless local area network access point, from among the at least one wireless local area network access point, in response to a command from the radio access network element, and
notify the radio access network element of the established wireless local area network connection with the selected wireless local area network access point;
wherein the wireless local area network interface is further configured to
receive a plurality of probe packets from the radio access network element via an IP tunnel between the radio access network element and the user equipment through the selected wireless local area network access point,
transmit a probe packet response to the radio network access element through the IP tunnel, the probe packet response being indicative of a connection quality of the IP tunnel, and
receive downlink traffic from an application server according to a first traffic routing mode or a second traffic routing mode based on the probe packet response;
wherein in the first traffic routing mode, the wireless local area network interface is configured to receive downlink traffic from the application server via a first data path through the selected wireless local area network access point; and
wherein in the second traffic routing mode, the wireless local area network interface is configured to receive the downlink traffic from the application server via a second data path including the IP tunnel between the radio access network element and the user equipment through the selected wireless local area network access point.

18. The user equipment of claim 17, wherein the obtained wireless local area network access point parameters include service set identifiers, received signal strength indications and an estimated available bandwidth for the user equipment at the at least one wireless local area network access point.

19. The user equipment of claim 17, wherein the probe packet response includes a set of the received plurality of probe packets, an estimated available bandwidth for the user equipment at the at least one wireless local area network access point, and a number of transmitted probe packets not received at the user equipment.

20. A user equipment comprising:
a cellular interface configured to communicate with a radio access network element via a cellular link;
a wireless local area network interface configured to communicate via a wireless local area network link; and
a processor configured to execute computer readable instructions to cause the user equipment to
obtain, in response to instruction from the radio access network element, wireless local area network access point parameters from at least one wireless local area network access point,
report the obtained local area network access point parameters to the radio access network element,
establish a wireless local area network connection with a selected wireless local area network access point, from among the at least one wireless local area network access point, in response to a command from the radio access network element,
notify the radio access network element of the established wireless local area network connection with the selected wireless local area network access point, and
receive downlink traffic from an application server according to a first traffic routing mode or a second traffic routing mode based on a probe packet response from the user equipment;
wherein, in the first traffic routing mode, the wireless local area network interface is configured to receive downlink traffic from the application server via a first data path through the selected wireless local area network access point; and
wherein, in the second traffic routing mode, the wireless local area network interface is configured to receive the downlink traffic from the application server via a second data path including an IP tunnel between the radio access network element and the user equipment through the selected wireless local area network access point.

21. The user equipment of claim 20, wherein the obtained wireless local area network access point parameters include service set identifiers, received signal strength indications and an estimated available bandwidth for the user equipment at the at least one wireless local area network access point.

22. The user equipment of claim 20, wherein the probe packet response includes a set of the received plurality of probe packets, an estimated available bandwidth for the user equipment at the at least one wireless local area network access point, and a number of transmitted probe packets not received at the user equipment.

* * * * *